United States Patent [19]

Peltonen

[11] Patent Number: 4,497,645
[45] Date of Patent: Feb. 5, 1985

[54] METHOD OF AND FURNACE ASSEMBLY FOR BENDING GLASS SHEETS

[75] Inventor: Esko J. Peltonen, Suorama, Finland

[73] Assignee: O/Y KYRO A/B Tamglass, Tampere, Finland

[21] Appl. No.: 600,788

[22] Filed: Apr. 16, 1984

[30] Foreign Application Priority Data

Jul. 25, 1983 [FI]  Finland ................................ 832684

[51] Int. Cl.$^3$ ........................................... C03B 23/025
[52] U.S. Cl. ....................................... 65/107; 65/104;
                                          65/114; 65/273; 65/287
[58] Field of Search ................ 65/104, 106, 273, 107,
                                          65/287, 291, 114

[56] References Cited

U.S. PATENT DOCUMENTS

| | | | |
|---|---|---|---|
| 2,646,647 | 7/1953 | Bamford et al. | 65/104 X |
| 3,129,088 | 4/1964 | Ritter, Jr. | 65/107 X |
| 3,884,667 | 5/1975 | Schraven | 65/119 |
| 4,072,492 | 2/1978 | Castine, Jr. | 65/107 |
| 4,089,668 | 5/1978 | Comastri | 65/104 |

FOREIGN PATENT DOCUMENTS

| | | |
|---|---|---|
| 44933 | 2/1974 | Finland . |
| 175749 | 1/1957 | Sweden . |

*Primary Examiner*—Arthur Kellogg
*Attorney, Agent, or Firm*—Burns, Doane, Swecker & Mathis

[57] ABSTRACT

A method of and a furnace assembly for bending glass sheets. Glass sheets (6) are conveyed in bending moulds (5) supported by cars (4) along an upper transport run (2) periodically from one heating section (10) to another. In the final heating section, temperature is risen so high that a glass sheet bends by the action of heat and gravity to conform with the surface of the mould. Thereafter, a car (4) together with a bent glass sheet is lowered onto a lower run (3) and returned to the outset of a furnace (1). On cooling, the glass sheets on said lower run emit heat to the glass sheets on said upper run through the open bottom structures of cars (4). The weight and heat capacity of the cars have been made as low as possible by removing the side and back walls thereof, whereby only the front or leading walls (8) provide locking walls between sections (10) successive in the longitudinal direction of the furnace.

13 Claims, 5 Drawing Figures

METHOD OF AND FURNACE ASSEMBLY FOR BENDING GLASS SHEETS

The present invention relates to a method of bending glass sheets, in which method the glass sheets are positioned upon bending moulds supported by transfer cars, the successive cars are conveyed periodically from a heating section to another, temperature of the glass sheets is elevated by means of heating resistances provided in each heating section, the deflection is monitored through observation windows in the end wall of the last heating section, and a glass sheet is heated until observation is made that it has bent by the action of heat and gravity to the curvature corresponding to said mould, whereafter the car of said last heating section is lowered from the upper transport run to the lower run along which the cars are conveyed periodically in the direction opposite to that of the upper run and at the termination of said lower run a car is passed through an opening in the end wall of a furnace out of said furnace and the bent glass is replaced with a glass to be bent and the car is returned into the furnace and lifted up to the upper run.

The invention relates also to a furnace assembly as set forth in the preamble of the annexed claim 4 for embodying the method.

This type of method and assembly are prior known from the applicant's earlier FI patent publication No. 44933. In that publication, the cars are designed as boxes, in other words there is a heat-insulated box for each bending mould. Such furnace is suitable for bending glass sheets of varying thickness and sizes but the mass of a carriage box becomes too great and both glass and carriage box must be heated and chilled during a bending cycle. Thus, most of the energy will be spent for heating and chilling of a carriage box.

Another drawback is that loading and unloading of glass are inconvenient procedures due to the hot edges of a carriage box and a long reaching distance. In other words, replacement of glass is ergonomically very difficult. On the other hand, due to the bottom and high side walls of a box, the furnace cannot be provided with an automatic loading device.

Although this bending furnace operating with carriage boxes works in a manner that the carriages or cars loaded with bent glasses return by way of a lower run, very little of the thermal energy possessed by the glasses and carriages down below can be used for those above because of the bottom and insulations of carriage boxes. Therefore, the energy consumption of this type of furnaces varies within the range of 10 to 20 kWh/m².

An object of the invention is to improve the above-mentioned method and furnace assembly in a manner that the masses to be heated and chilled can be substantially reduced and, at the same time, the thermal energy delivered by glass sheets on chilling can be exploited more effectively than before.

This object is achieved on the basis of the inventive characteristics set out in the annexed claims.

One embodiment of the invention will now be described in more detail with reference made to the accompanying drawings, in which FIG. 1 is a partially cut-away side view of a furnace assembly of the invention.

Figure 4:
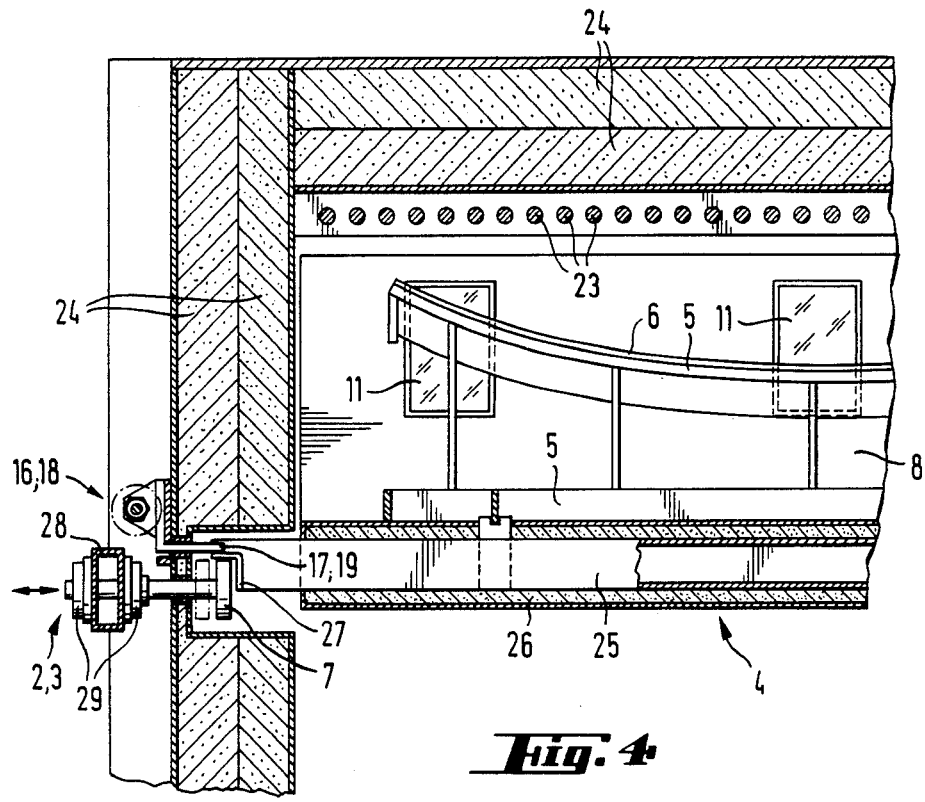
FIG. 4 shows a detail of the assembly in cross-section taken at the side wall of a furnace.

First described is the design of a furnace assembly. An elongated furnace 1 is completely closed at its termination and its ceiling, side walls and bottom are provided with thermal insulations 24. The side walls of a furnace is provided with an upper transport run 2 and a lower transport run 3. The transport runs are designed, as shown in FIG. 4, in a manner that a rail 28 secured to the side wall is provided with bearings 29 used for carrying free rotating rollers 7 which are inside said furnace thermal insulation 24.

Conveyed along each transport run 2 and 3 are cars 4, each supporting a bending mould 5 upon which a glass 6 to be bent is placed.

Car or carriage 4 is provided with an open-structure, half or completely closed bottom 25 and a front wall 8. The car bottom comprises a tubular frame 25, consisting of a tube extending along side edges and surrounded by a heat insulation 26. Thus, in the central area, the bottom provided by said tubular frame 25 is completely open or covered by a mesh, grate or a thin corrugated sheet for allowing heat to pass readily through the bottom. Extending sideways from tubular frame 25 is a rail 27 on which said car 4 travels upon rollers 7. Hence, car 4 has no side or back walls. In the transport direction of upper run 2, the front wall 8 joins to the heat-insulated side walls of a furnace with as small a clearance as possible.

Figure 5:
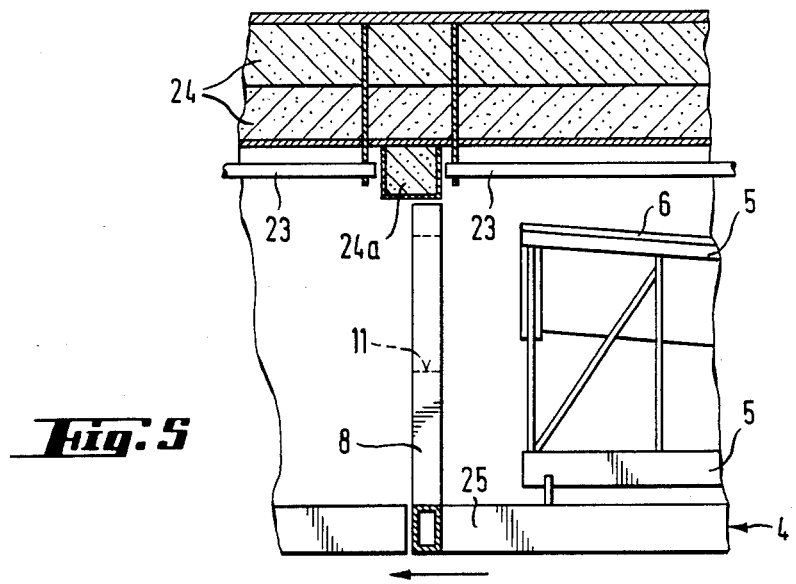
FIG. 5 shows a detail of the furnace as a longitudinal section taken at the transition point between upper run heating sections.

Extending downwards from the thermally insulated ceiling 24 of a furnace is a heat insulation 24a with car-sized gaps (FIG. 5), the upper edge of front wall 8 extending to the level of the bottom surface of said heat insulation. When a train of cars on the upper run 2 is stopped in a manner that front walls 8 are aligned with heat insulations 24a, a separate heating section 10 will be formed in the longitudinal direction of a furnace at each car. The ceiling of each heating section 10 is fitted with electric resistance elements 23, arranged in a manner that temperature of successive heating sections 10 rises gradually towards the termination of furnace 1.

The rear end of the furnace is provided with a heating and bending section 14 which is fitted with a lift 14a (FIG. 3) for lowering cars 4 from upper to lower run. Lift 14a may comprise an articulated jack or vertical piston-cylinder units. What is essential about this lift is that the lift bottom 13 is thermally insulated in a manner that, with bottom 13 elevated against the bottom of a car 4 on the upper run, said bottom closes the final heating section 10 where a glass sheet is heated until it is sufficiently soft to bend under the gravity to a shape complying with the surface of a mould. The operator of a furnace assembly monitors the bending process of a glass sheet through said observation windows 12 in the end wall of a furnace. Aligned with windows 12 the front wall 8 of each car is also provided with observation windows 11. When a glass sheet is bent, car 4 is removed by means of lift 14a, 13 from upper to lower run along which cars 4 are conveyed in the opposite direction, i.e. returned towards the outset of a furnace.

Figure 2:
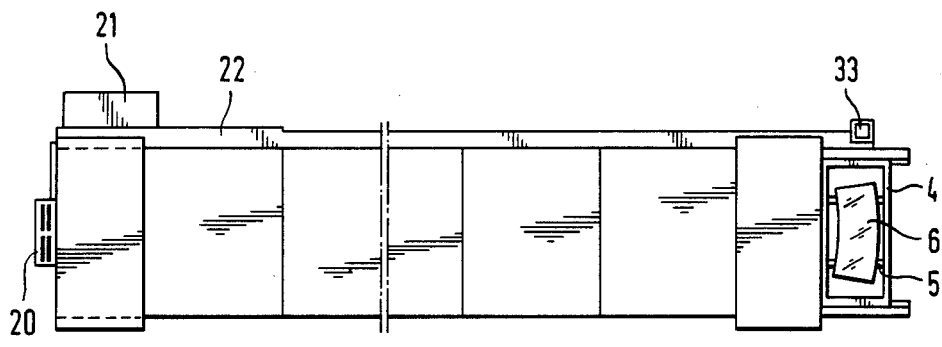
FIG. 2 is a plan view of the same furnace assembly.

For transferring the cars, the outset of the upper run is fitted with a piston-cylinder device 16 whose gripping means 17 catches around the edge of a car bottom. The stroke length of piston-cylinder device 16 corresponds to that of a car. The same way, the outset of lower run 3 (i.e. termination of the furnace) is provided with a piston-cylinder means 18 with its gripping means 19. Reference numeral 20 designates a control panel whereby the operation of the assembly is controlled by the operator monitoring the glass deflection. Reference numeral 21 (FIG. 2) designates a power centre and numeral 22 an electric cable duct.

Figure 1:
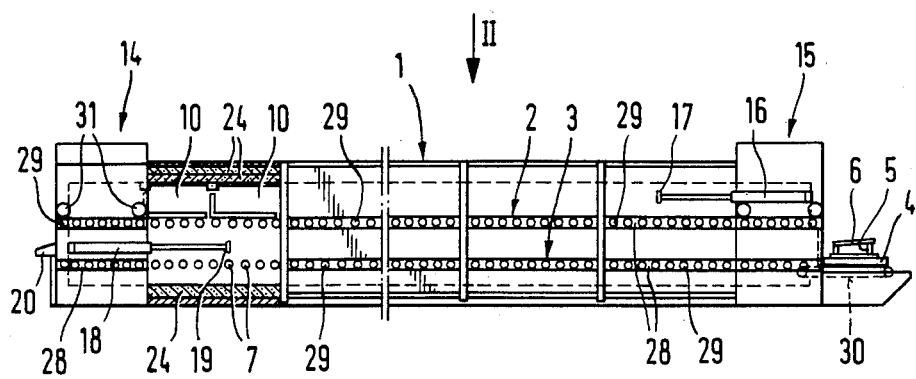

Aligned with lower run 3, the outset of a furnace is provided with a car gate 9 through which cars 4 can be steered out for replacement of glass. During the glass replacement, the front wall of car 4 closes said gate 9 to stop heat escape out of the furnace. A conveyor 30 shown in FIG. 1 drives cars 4 out and back in the furnace. Following the glass replacement, car 4 is elevated by means of a lift 15*a* onto the upper run.

The above furnace assembly differs from the prior art especially for the design of a transport car. Said transport car is not a closed box insulated in the sides and bottom but such transport car only has an insulated front wall which joins to a rim-shaped bottom structure, the latter being either open or covered by a mesh, grate or a thin corrugated sheet. Thus, the heat transfer taking place through the bottom has been made as easy as possible.

Figure 3:
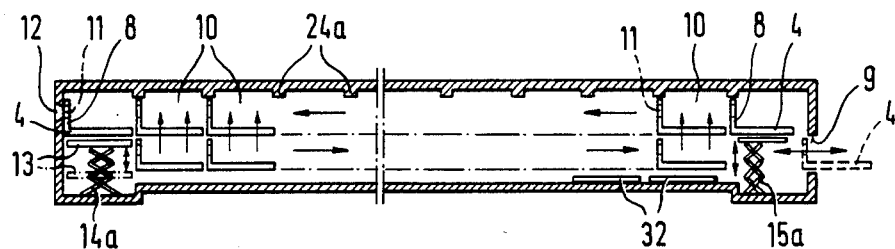
FIG. 3 shows schematically the longitudinal section and operating principle of a furnace assembly.

The furnace operates as follows. The outset position is shown in FIG. 3 with lifts 14*a* and 15*a* up. Then lift 14*a* elevates car 4 slightly in order to loosen rails 27 from rollers 7. The side rails 28 of section 14 are opened by displacing them with rollers 7 sideways. This is effected by means of shifting cylinders 31. When glass has bent sufficiently in the last heating and bending section 14, lift 14*a*, 13 is lowered down together with its mould 5. After the lift is lowered down, the side rails 28 and rollers 7 of the upper run 2 of section 14 close and piston-cylinder devices 16, 17 pull a train of cars on upper run 2 forward by one section 10. When the pulling is over, cylinders 16 return to the basic position and lift 15*a* at the loading end of a furnace descends. When lift 15*a* has been fully lowered, the lower run piston-cylinder devices 18, 19 effect a pull equal to the length of section 10. When the pulling is over, cylinders 18 return and the bending end lift 14*a* rises up. Activated at the same time is the motor of conveyor 30 pulling said car 4 from lift 15*a* to the loading station. Thus, the car front wall 8 closes gate 9 and loading can be effected from any of the three directions as there are no side walls or a back wall in the car.

As the bending end lift 14*a*, 13 is rising to the up position, said lift again picks up car 4 together with its rail 27 from support rollers 7 and side bars 28 open. Effected simultaneously is the glass replacement on mould 5 of a car 4 now on loading conveyor 30 by removing a bent glass and replacing an unbent one. When the glass replacement is done, an acknowledgement button 33 is pressed with a result that loading conveyor 30 pulls car 4 into the furnace. When the pulling is over, lift 15*a* picks up the car onto upper run 2 to commence the following cycle.

The car mass to be heated and chilled is minimum as the cars only comprise a front wall, a base frame, and possibly a very light-structured bottom. During a heating cycle between each transfer cycle, said front walls 8 of the cars separate the heating sections 10 from each other in the longitudinal direction of a furnace. At the same time, on the lower chilling run there are separated chilling sections aligned with heating sections 10. The hot glasses in chilling sections deliver heat through radiation and convection to a glass on the upper run directly through the bottom of car 4. This requires, of course, that a glass sheet arriving in each heating section 10 is at lower temperature than the one positioned directly below on the lower run. The sections towards the lower run loading end are further provided with cooling radiators 32, the waste heat transferring to the latter being recoverable by circulating the cooling medium e.g. in the radiators of a building to be heated. By means of cooling radiators 32 a glass sheet can be chilled or cooled to a suitable temperature prior to its arrival in the loading station.

By means of this arrangement of the invention the thermal energy required for bending a glass sheet has been cut down to less than half compared to the prior art bending furnace assemblies. Energy consumption varies from 3 to 5 kWh/m$^2$ when the total thickness of pairs of glass to be bent on top of each other is 4–6 mm.

I claim:

1. A method of bending glass sheets, wherein glass sheets are placed upon bending moulds (5) supported by transport cars (4), successive cars (4) are displaced periodically from one heating section (10) to another, temperature of glass sheets (6) is elevated by means of heating resistances (23) fitted in each heating section (10), in the final heating section a glass sheet (6) is heated until it bends by the action of heat and gravity to the curvature corresponding to mould (5), whereafter a car (4) in the final heating section is lowered from an upper transport run (2) to a lower run (3) along which cars (4) are displaced periodically in the transport direction opposite to that of the upper run and, at the loading end of a furnace (1), car (4) is steered through a gate (9) in the end wall of said furnace out of the furnace and a bent glass is replaced with a glass to be bent and car (4) is returned into the furnace and lifted onto upper run (2), characterized in that separation of heating sections (10) from each other into sections separate in the longitudinal direction of furnace during each heating cycle is effected only by means of front walls (8) of cars (4) and separation of chilling sections from each other into sections separate in the longitudinal direction of furnace during each chilling cycle is also effected only by means of said front walls (8) of cars, and that the glass sheets on lower run (3) by having them deliver heat through the open-structured or otherwise well heat transferring bottoms (25) of cars (4) to the glass sheets to be heated on upper run (2).

2. A method as set forth in claim 1, characterized in that during glass replacement said car gate (9) is closed by front wall (8) of a car.

3. A method as set forth in claim 1, characterized in that the bottom of a car (4) in the final heating section (10) is closed by the heat-insulated bottom (13) of a lift and, after the bending, car (4) is lowered by means of the lift from upper run (2) to lower run (3).

4. A furnace assembly for bending glass sheets comprising:
- an elongated furnace (1), having a loading end and a bending end and whose bending end is closed,
- an array of cars (4), each having a bending mould (5) for receiving glass sheets (6) and for bending them by means of heat and gravity,
- an upper transport run (2) for conveying cars (4) from one heating section (10) to another,
- electric resistance elements (23) in the ceiling of heating sections, a lower transport run (3) for returning cars (4) back to the loading end of the furnace below the cars of upper run (2), a gate (9) at the loading end of said furnace for passing cars (4) in and out, a lift device (15a) at the loading end of the furnace for picking up cars (4) from the level of lower run (3) to the level of upper run (2), a lift device (14a) at the furnace for lowering cars (4) from the level of upper run (2) to the level of lower run (3), and displacement means (16, 17; 18, 19) for moving cars (4) on upper run (2) from the furnace loading end to its bending end and on lower run (3) in the opposite direction, characterized in that the side walls and back wall of cars (4) are missing partially or completely and only the front wall (8) (leading wall in the upper run transport direction) is sufficiently high and integral to provide a lock in the longitudinal direction of the furnace between successive sections (10) and that the bottom design (25) of cars (4) is such that heat can readily transfer from the lower run glass sheets to the upper run glass sheets.

5. A furnace assembly as set forth in claim 4, characterized in that the bottom of car (4) is covered with a mesh, grate or a thin corrugated sheet whose coefficient of heat radiation is high, preferably more than 0,5.

6. An assembly as set forth in claim 4, characterized in that the height of front wall (8) is less than the fall between upper and lower run (2 and 3) by merely a gap allowing for transport motion, whereby it is possible to provide the lower run with chilling sections separated by front walls (8) and aligned with heating sections (10) of the upper run.

7. An assembly as set forth in claim 4, characterized in that said car gate (9) at the furnace loading end is closed by front wall (8) of a car during glass replacement.

8. An assembly as set forth in claim 4, characterized in that said car front walls (8) are provided with observation windows (11) and the end wall of the bending end of the furnace is provided with an observation window or windows (12), aligned with windows (11) of the cars on upper run (2).

9. An assembly as set forth in claim 4, characterized in that said lift (14a) at the bending end of a furnace is provided with a heat-insulated bottom (13) for closing the bottom of the final heating section (10) when said lift (14a, 13) is in its elevated position.

10. An assembly as set forth in claim 4, characterized in that said transport runs (2, 3) consist of freely rotating rollers (7), which are mounted on rails (28) in the side walls of a furnace, the rails (27) mounted on the side edges of the car bottom frame (25) traveling upon said rollers.

11. An assembly as set forth in claim 10, characterized in that said rails (28) of the final heating section as well as its rollers (7) are adapted to be displaceable in lateral direction.

12. A method as set forth in claim 2, characterized in that the bottom of a car (4) in the final heating section (10) is closed by the heat-insulated bottom (13) of a lift and, after the bending, car (4) is lowered by means of the lift from upper run (2) to lower run (3).

13. An assembly as set forth in claim 6, characterized in that said car gate (9) at the furnace loading end is closed by front wall (8) of a car during glass replacement.

* * * * *